June 10, 1952  L. W. WIGHTMAN  2,600,353
VIBRATION ISOLATOR
Filed Aug. 24, 1950
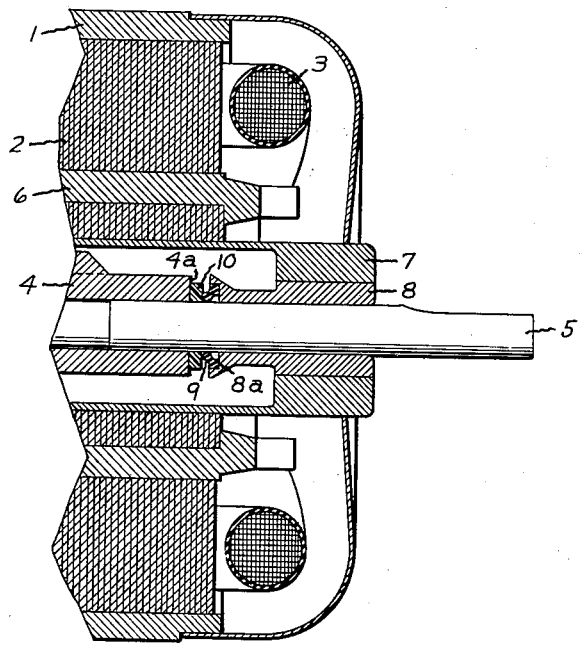
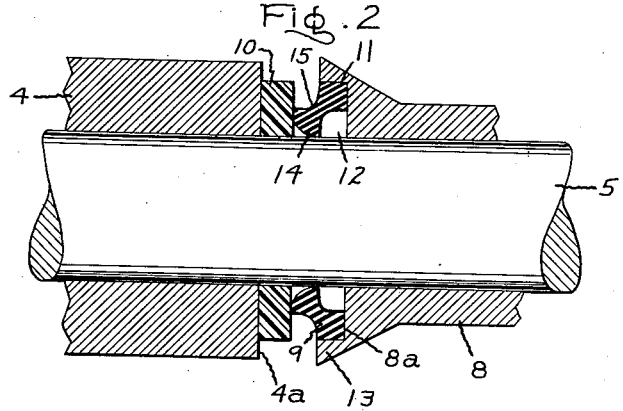
Inventor
Lawrance W. Wightman
by Ernest H. Britton
His Attorney Patented June 10, 1952

2,600,353

UNITED STATES PATENT OFFICE 2,600,353

VIBRATION ISOLATOR

Lawrance W. Wightman, Fort Wayne, Ind., assignor to General Electric Company, a corporation of New York Application August 24, 1950, Serial No. 181,198

1 Claim. (Cl. 308—163)

This invention relates to mountings for use in suppressing undesirable sounds due to the end play of small rotating shafts. This invention is well adapted for use in connection with small electric motors. It is to be understood, however, that this invention is not necessarily limited thereto.

In the operation of squirrel-cage motors, the usual spiral of the rotor bars causes an axial end bump vibration to be set up. This vibration causes a wear washer located between a thrust shoulder on the motor shaft and a stationary thrust shoulder on the end of the bearing to vibrate against the thrust shoulders. Such vibration gives rise to a knocking or bumping sound and is therefore objectionable.

The object of the present invention is to provide a thrust washer which is subjected to shear so as to hold a wear washer continually against the adjacent thrust shoulder while permitting the rotor to vibrate axially to practically its full amplitude.

Further objects and advantages of this invention will become apparent and the invention will be better understood from the following description referring to the accompanying drawing. The features of novelty which characterize this invention will be pointed out with particularity in the claim annexed to and forming part of this specification.

In the drawing, Fig. 1 shows a fragmentary sectional elevational view of a unit bearing motor embodying this invention; Fig. 2 is an enlarged fragmentary sectional view showing the details of the thrust washer in the assembly of Fig. 1.

In accordance with this invention, there is provided a molded thrust washer, formed of synthetic rubber or other suitable resilient material, having outer and inner annular enlarged portions connected by a central annular necked-down portion. The inner and outer portions are axially offset, and the central necked-down portion is adapted to be subjected to shear as a result of an axial force tending to radially align the inner and outer thickened portions. This thrust washer is positioned between the thrust shoulder or rotating shaft and a wear washer which engages the stationary thrust shoulder of the bearing. The thrust washer is so proportioned as to have very low damping and a very flat force deflection characteristic so that it allows the rotor to vibrate to practically its full amplitude and holds the wear washer continually against the stationary thrust shoulder to thereby prevent noise due to vibration of the wear washer against the stationary thrust shoulder.

Referring to the drawing, 1 indicates an electric motor housing having a stator core 2 and a stator winding 3. Rotor shaft 5 is rotatably supported by stationary sleeve bearing 4 and carries rotor 6 through supporting quill 7 and shaft sleeve 8. Shaft sleeve 8 may be splined to shaft 5, or secured thereto by any suitable means. The end of stationary sleeve bearing 4 provides a stationary thrust shoulder 4a, and the end of shaft sleeve 8 provides a thrust shoulder 8a. This invention relates particularly to the thrust washer located between the thrust shoulder 4a and the thrust shoulder 8a.

Referring particularly to Fig. 2, thrust washer 9 is positioned between wear washer 10 adjacent shoulder 4a on sleeve bearing 4 and shoulder 8a of shaft sleeve 8. Wear washer 10 is formed of a suitable material capable of withstanding wear and which is not adversely affected by moisture. Preferably I employ a nonmetallic material such as spinnable textile fibers united and held in a highly compressed state by an artificial resin such as a phenolic condensation product.

Thrust washer 9 is ordinarily fabricated and molded in one operation. It is made from a resilient material, as for example an oil resistant synthetic rubber, and is proportioned so as to have very low damping and a very flat force deflection characteristic. To accomplish this, thrust washer 9 has an outer annular thickened portion 11 adapted to be positioned in cup-shaped recess 12 formed by flange 13 and thrust shoulder 8a of shaft sleeve 8. The inner annular portion 14 of thrust washer 9 is likewise thickened and is offset axially relative to thickened portion 11. Thickened portions 11 and 14 are connected by a necked-down portion 15.

Since outer portion 11 of thrust washer 9 is restrained in a radial direction by flange 13, the material forming the thrust washer is not required to be strong enough to maintain its shape radially. Therefore, thrust washer 9 may be designed with regard to its damping and force deflection characteristics only. Since rubber in shear is very much softer than rubber when subjected to direct stress, the use of a rubber element having the cross-sectional configuration shown in the drawing is a very convenient method to use in obtaining these desired characteristics. Obviously flange 13 could be formed on bearing 4 and thrust washer 9 could be used to bias wear washer 10 against thrust shoulder 8a.

Thrust washer 9 normally holds wear washer 10 in contact with shoulder 4a of the stationary sleeve bearing 4. When shaft 5 is rotating, the spiral of the rotor bars causes shaft 5 to vibrate axially. Because of the design of thrust washer 9, shaft 5 encounters very little resistance to this vibration and vibrates to practically its full amplitude with the necked-down portion 15 of the thrust washer absorbing the vibrational forces in shear and at the same time maintaining wear washer continually against thrust shoulder 4a. This results in the elimination of the vibrational noises due to the vibration of wear washer 10 against shoulder 4a while sufficiently restraining shaft 5.

It is therefore apparent that the design of thrust washer 9 permits shaft 5 to vibrate axially to practically its full amplitude because it is capable of accommodating a substantial axial movement of the shaft without substantial variation in its damping and force deflection characteristics. This results in a washer having a very low natural frequency which is nevertheless capable of supporting maximum thrust load.

While there is illustrated and described a particular embodiment of this invention, modifications thereof will occur to those skilled in the art. It is to be understood, therefore, that this invention is not to be limited to the particular arrangement disclosed, and it is intended in the appended claim to cover all modifications which do not depart from the spirit and scope of this invention.

What I claim as new and desire to secure by Letters Patent of the United States is:

In combination, a bearing member, a rotatable shaft seated in said bearing, a rotatable member mounted on said shaft, one of said members having a cup-shaped annular recess formed in its axial end, a thrust washer surrounding said shaft and engaging the axial end of the other of said members, and a yieldable resilient member moulded as a unitary structure having an inner thickened annular portion surrounding said shaft and engaging said thrust washer and an outer thickened annular portion seated against the circumferential wall of said recess, said inner and outer thickened portions being axially offset and connected by an intermediate annular necked-down portion, said necked-down portion being subjected to shear to hold said thrust washer in engagement with said other member and to resiliently cushion axial movement of said shaft and rotatable member with respect to said bearing.

LAWRANCE W. WIGHTMAN.

REFERENCES CITED

The following references are of record in the file of this patent:

UNITED STATES PATENTS

| Number | Name | Date |
|---|---|---|
| 662,777 | Dolson | Nov. 27, 1900 |
| 1,854,410 | Koehly | Apr. 19, 1932 |
| 2,009,124 | Skolfield | July 23, 1935 |
| 2,307,772 | Duffy | Jan. 12, 1943 |